Aug. 23, 1955

L. C. FRAZIER 2,715,932

TIRE BUILDING DRUM (BICYCLE TYPE)

Filed March 4, 1953

INVENTOR.
LARRY C. FRAZIER
BY Ely, Frye & Hamilton
ATTYS.

Aug. 23, 1955        L. C. FRAZIER        2,715,932
TIRE BUILDING DRUM (BICYCLE TYPE)
Filed March 4, 1953        3 Sheets-Sheet 2

INVENTOR.
LARRY C. FRAZIER
BY *Ely, Frye & Hamilton*

ATTS.

Aug. 23, 1955        L. C. FRAZIER        2,715,932

TIRE BUILDING DRUM (BICYCLE TYPE)

Filed March 4, 1953        3 Sheets-Sheet 3

INVENTOR.
LARRY C. FRAZIER
BY *Ely, Frye & Hamilton*
ATTYS.

United States Patent Office 2,715,932
Patented Aug. 23, 1955

2,715,932

TIRE BUILDING DRUM (BICYCLE TYPE)

Larry C. Frazier, Niles, Mich., assignor, by mesne assignments, to The Goodyear Tire & Rubber Company, a corporation of Ohio Application March 4, 1953, Serial No. 340,289

15 Claims. (Cl. 154—9)

The present invention relates to tire building drums on which the fabric plies, beads and tread of the tire are assembled in so-called "flat band" form. The drum of the present invention is designed primarily for use with the method and apparatus invented by the present applicant and shown in United States Patents Nos. 2,440,662, April 27, 1948, and 2,565,071, August 21, 1951. In the process of my prior patents the fabric layers are wrapped about the main building drum and auxiliary drums at either side of the main drum. Beads are applied to the fabric at the edges of the main drum and then the skirts are folded over the beads by the use of a cage and expansible tubes in the manner clearly shown and described in the prior patents.

The drum shown in this application is by no means limited in its usefulness to the tire making process or apparatus of my prior patents, but may be used advantageously with other types of tire building operations. The ply folding means is shown and described in order that the invention may be better understood, and without any limiting effect upon the invention sought to be covered herein.

In the building of tires by the flat band method it is desirable to apply the rubberized fabric plies of the well known bias cut cord fabric construction about the drum with outwardly extending edges which are subsequently wrapped around the inextensible bead cores. In some cases the skirts which are turned over the beads may extend for short distances beyond the beads, or they may extend across the drum and constitute body plies.

To place the beads correctly the building drum is formed with shoulders along each edge of the drum which constitute abutments against which the bead cores are placed. After the tire body is built up, which usually includes the tread and side wall rubbers, the abutments are collapsed to permit the completed but unvulcanized carcass to be removed for subsequent shaping into tire form and vulcanization.

The present invention is primarily designed for use in the manufacture of relatively small tires, such as bicycle tires, and the purpose of the invention is to provide a light, simple and easily operated drum on which the tire may be built and from which it may be readily stripped. It will be understood, however, that the principles of the invention may be used for the building of other types and sizes of tires.

The advantages of the new design of tire building drum lie in the economies of building and operation and in the simplicity of design and ease of operation.

Figure 1:
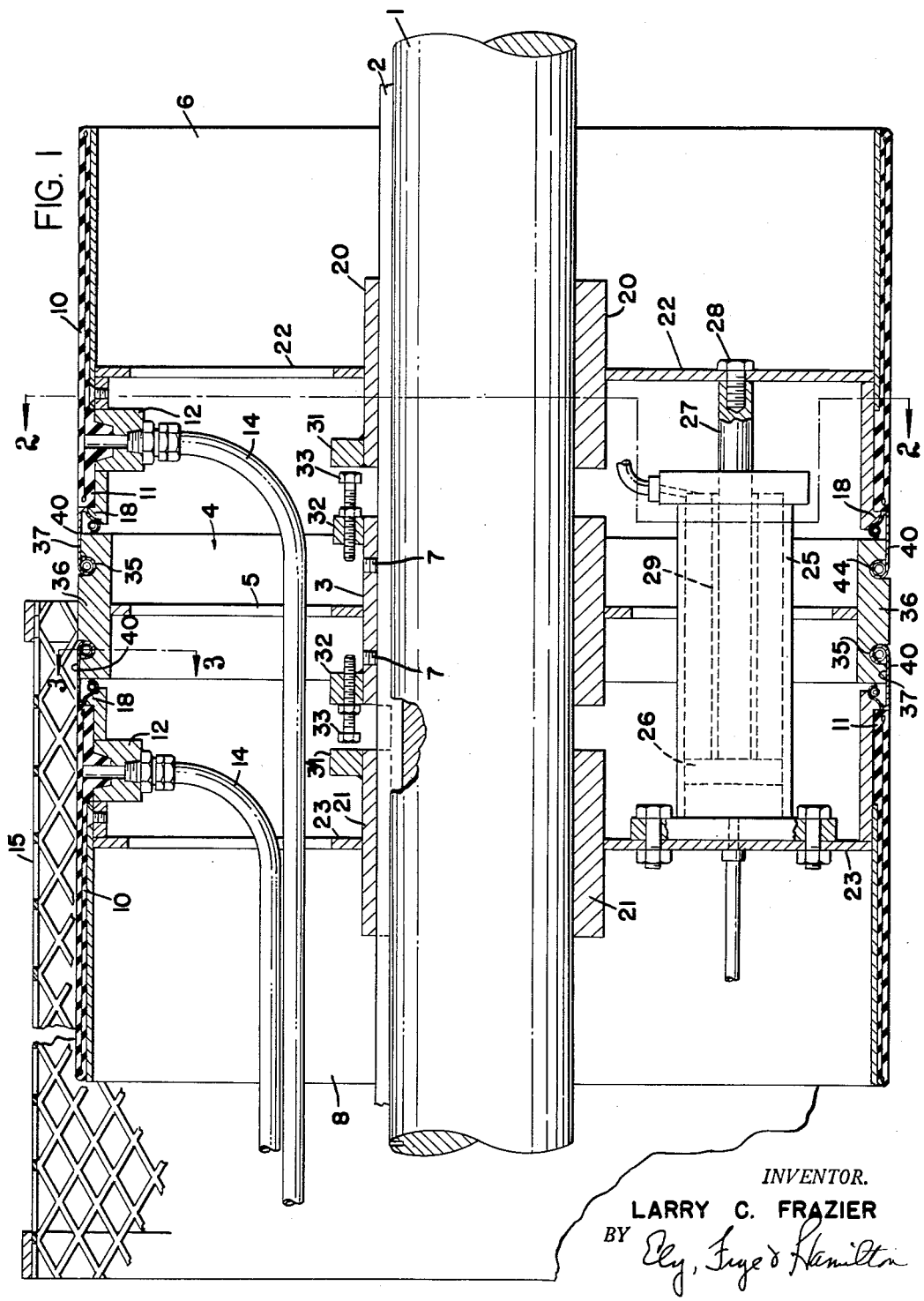
Fig. 1 is a longitudinal section on the line 1—1 of Fig. 2 taken along the shaft of a tire building machine in which the drum is shown as flanked on either side by an auxiliary drum on which the folding tubes characteristic of my prior patents are mounted. A cage is also shown, but operating mechanism for the cage is omitted as it forms no part of the present invention.

In the drawings, the shaft of the tire making machine is indicated at 1. This shaft is rotatable so that the fabric and tread may be wrapped around the drum and for any stitching operation which may be required for the plies or the tread, the several parts being keyed to the shaft at 2.

The central or main building drum is given the numeral 4. The drum is supported on a sleeve 3 through a web 5 and is fixed to the shaft by set screws 7. The right hand auxiliary drum is indicated at 6 and the left hand auxiliary drum at 8. The perimeter of each auxiliary drum is below the surface of the main drum so as to accommodate an expansible folding tube 10 which is anchored in each auxiliary drum at a point adjacent the main drum by a rib 11 set in a groove in the drum. The outer surface of each tube 10 in collapsed condition is flush or slightly below the level of the main drum. To each folding tube at the rib 11 are attached two blocks 12 in which are secured the delivery ends of flexible tubing 14 by which air under pressure is delivered to the folding tube 10. The shiftable cage 15 by which either tube 10 is folded over the main drum to apply the skirts of fabric to the main drum is shown in the drawings but the means for shifting the cage along the axis of the drum is not shown.

The edge of each auxiliary drum adjacent the central or main drum 4 is turned down to form a tapered or rounded shoulder or ledge 18 for a purpose to be later described. The two auxiliary drums are slidable along the shaft 1 for limited distances to cause the shoulders 18 to approach or recede from the edges of the main drum. For this purpose the drum 6 is carried on a sleeve 20 slidable along and keyed to the shaft 1. A similar sleeve 21 is provided for the auxiliary drum 8. Connecting the sleeve 20 with the drum 6 is a web 22, the similar web for the drum 6 being indicated at 23.

Figure 2:
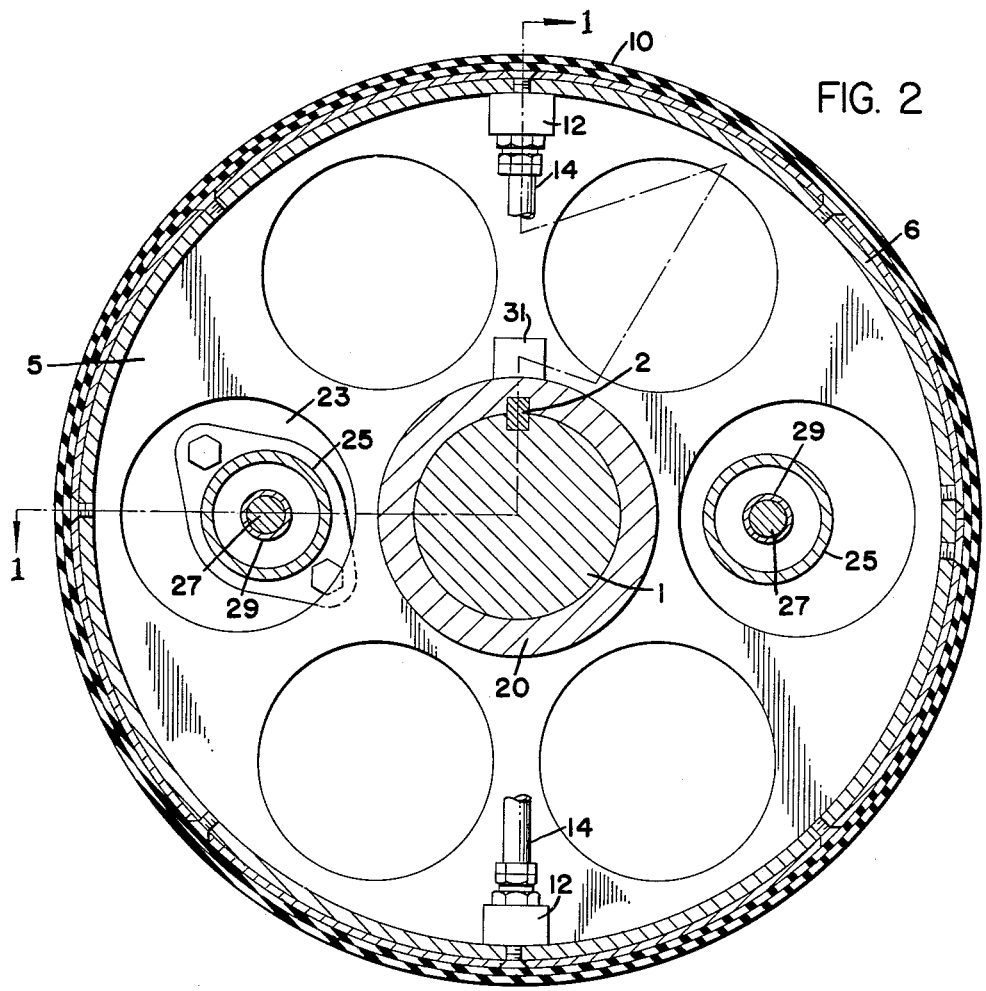
Fig. 2 is a section on the line 2—2 of Fig. 1.

Attached to the web 23 of the auxiliary drum 8 is the base of a pneumatic cylinder 25 which extends through a hole in the web 5 and in which is movable a piston 26, the piston rod 27 of which is anchored at 28 to the web 22 of the auxiliary drum 6. A sleeve 29 fitted over the piston rod 27 limits the outward movement of the auxiliary drums. Inward movement may be arrested by contact of the inner edges of the auxiliary drums with the main drum. However, it is preferred to arrange an adjustable stop mechanism which will permit the inward movement of the auxiliary drums to be arrested at various points depending upon the elevation which it is desired to give to the shoulder wings. Such means consists of lugs 31 welded to the ends of the sleeves 20 and 21 and lugs 32 welded to the ends of the sleeve 3. In the lugs 32 are bolts 33 which may be set and locked at any position so as to arrest the inward movement of the auxiliary drums at the points previously determined. A similar cylinder is attached to the web 22 at a diametrically opposite point as shown in Fig. 2 and has a similar piston and rod anchored to the web 23. Both cylinders are reversible so that when air is admitted to the ends thereof the two auxiliary drums will approach or recede from the main drum.

The periphery or building surface of the main drum 4 is an endless ring which is somewhat narrower than the distance between the bead seats. On each side of the center line of the drum is a groove 35 which opens outwardly on the building surface of the drum and is semicircular at its base to provide a bearing in which the shoulder wings may rotate by the action of camming surfaces, as will be explained. The center strip 36 or that portion of the drum between the grooves is somewhat higher than the surfaces 37 between the grooves and the edges of the drum so that the shoulder wings when in retracted or flat condition will be flush with the center portion of the drum.

Figure 3:
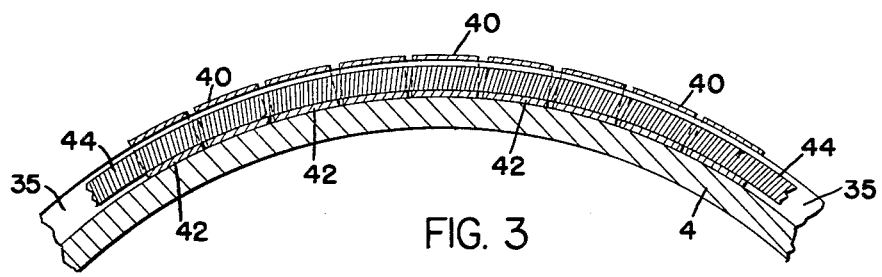
Fig. 3 is a fragmentary section on the line 3—3 of Fig. 1.
Figure 6:
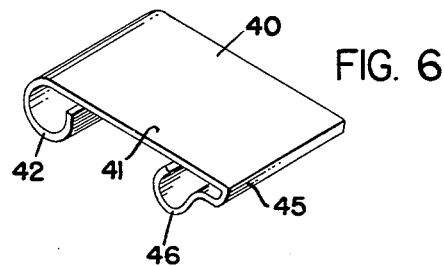
Fig. 6 is a view of one of the plates or wings which constitute the edge portions of the building drum.

The shoulder clips or wings which constitute the portions of the actual building surface on either side of the center strip are plates which are given the reference numeral 40. One of these plates is shown in Fig. 6. Two sets of these wings or shoulder clips are provided in sufficient number to encircle the drum 4 leaving a minimum gap between adjacent wings as shown in Fig. 3. The outer surface of each wing is flat as shown at 41 to form a continuation of the center ridge of the drum and to rest against the surfaces 37 when the wings are lowered in their horizontal position.

Figure 4:
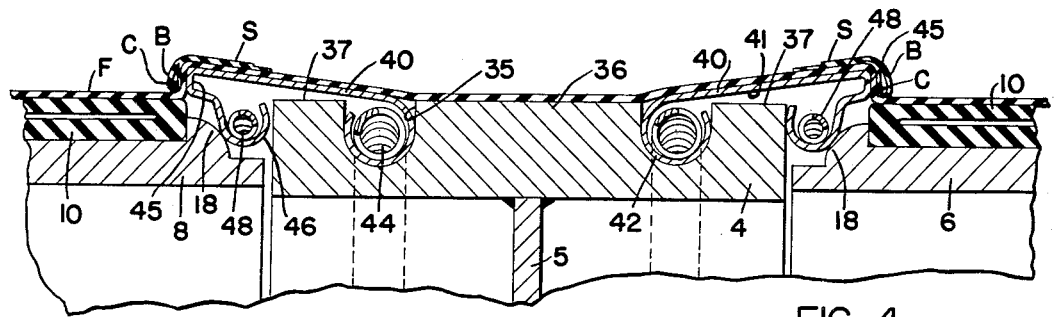
Fig. 4 is an enlarged axial section along the periphery of the drum showing the bead shoulder clips or wings elevated to form the abutments or bead seats and with a ply of fabric and the two beads in place.
Figure 5:
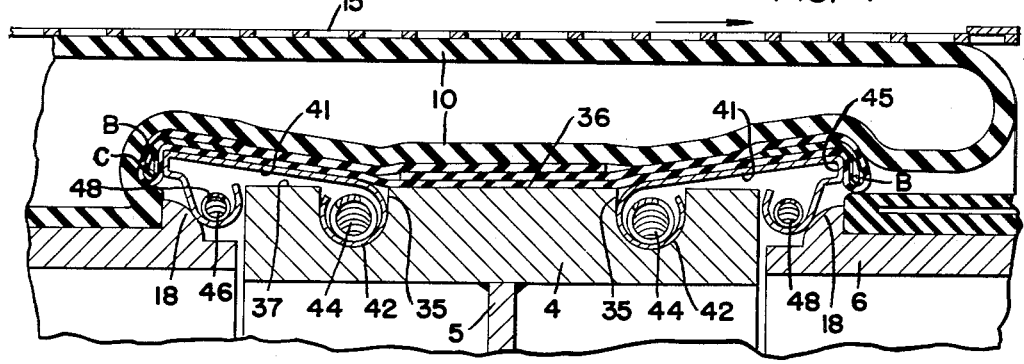
Fig. 5 is a similar view showing the folding over operations by which the body of the tire is made.

At the inner edge of each wing is a rolled bearing sleeve 42 which fits in the groove 35 so that the wing may rotate therein, and within the aligned sleeves of each set is a coiled garter spring 44 which, when each set of wings is assembled in this groove 35 will hold the wings snugly in position and allow the wings to rock from the position shown in Fig. 1 to that shown in Figs. 4 and 5.

The outer end of each wing is turned down to form a vertical wall portion 45 which is at a slight inwardly directed angle to the surface 41 so that when the wings are raised, the multiple surfaces 45 will form a bead positioning shoulder which is perpendicular to the axis of the drum.

From the shoulder 45 the metal of the clip is turned inwardly and in the form shown in Fig. 6 is curled to provide a bearing surface 46 which rests against the shoulder 18 on the adjacent auxiliary drum. In the channel formed by the curled portion 46 of each set of shoulder wings is a coiled garter spring 48 slightly weaker than the garter spring 44. The function of the spring 48 is to restore the shoulder wings to their horizontal positions when the auxiliary drums are withdrawn.

Figure 7:
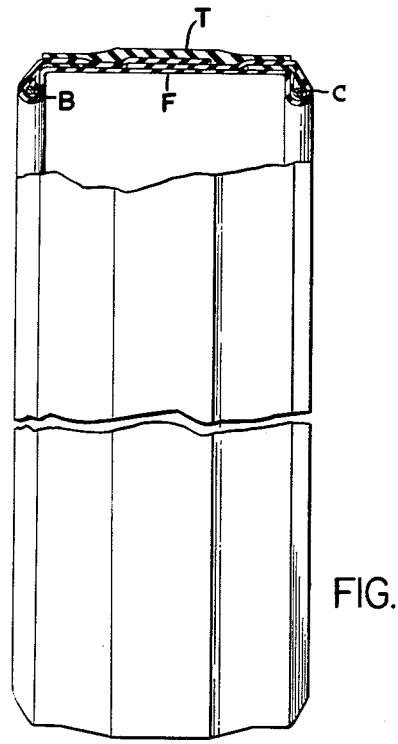
Fig. 7 is a view of the complete tire band as removed from the drum ready for the shaping and vulcanizing operations.

The operation of the apparatus will be understood from a brief description. At the start of the tire building operation the cage 15 is withdrawn and the ply or plies of rubberized bias-cut cord fabric are applied to the drum while it is in the condition shown in Fig. 1. In this condition the auxiliary drums are withdrawn to the outmost positions and the wings or shoulder clips 40 are in lowered or horizontal position with their outer ends supported on the shoulders 18 of the auxiliary drums. In Figs. 4 and 5 a single sheet of tire fabric is shown at F which is sufficient for small tires. The edges or skirts of the fabric overlie the folding tubes 10 on the auxiliary drums to the extent desired. In the tire shown in Fig. 7 the fabric is of sufficient width to overlap at the center or tread area of the tire band, but this is optional as any degree of overlap may be used. After the fabric is applied to the drum its ends are spliced in accordance with standard practices.

After the fabric is initially applied to the drum it is necessary to place the beads thereon. Beads are shown at B. The beads may be of any desired type, that shown consisting of a wire cable or core C and a bead cover or "flipper strip" S wrapped about the core and of sufficient width to extend into the side walls of the tire as is the usual practice.

The beads must be accurately located and set against positive shoulders on the drum. Before the beads are to be set the two auxiliary drums are moved to their innermost positions, which causes the shoulders 18 to raise the wings by moving under the surfaces 46, thus providing an action of camming surfaces. This action causes the surfaces 45 to assume the positions shown in Figs. 4 and 5, where they are perpendicular to the axis of the drum and form stops against which the beads are moved and set at the prescribed distances from the center line of the tire band. The beads may be set by hand or by bead rings as desired.

The operator now manipulates the cage and the folding tubes in the manner prescribed in my former patents to fold the skirts of the fabric from either side over the beads and overlapping at the center line of the tire. In Fig. 5 the shaping tube to the left has just completed its folding operation.

It will be noted that there is a wide valley over almost the entire width of the tire band during the folding operation due to the elevation of the bead setting shoulders or the wings. This does not interfere with the folding and pressing operation because the tubes 10 conform to the irregular surface of the drum.

After the fabric folding operation is finished the cage 15 withdraws and the tread T is applied and the auxiliary drums are withdrawn permitting the plates 40 to be returned to their lowered position, whereupon the completed tire band may be slipped off the drum assembly.

It is also possible in building the tire to apply the tread to the drum in the valley or swale between the raised shoulder wings before applying the fabric portions of the tire. This would necessitate turning the band inside out after its removal from the drum.

While the drawings and description have been quite specific, this is for the purpose of showing an actual practical embodiment of the invention and is not to be taken as limiting the invention to the form shown herein.

What is claimed is:

1. A tire building drum comprising a non-expansible central portion, expansible edge portions, and means to expand the edge portions radially outward to form bead setting shoulders extending beyond the central portion.

2. A tire building drum comprising a non-expansible central portion and a plurality of wings constituting the edges of the drum, and means to move said wings radially outwardly of the central portion to form bead setting shoulders extending beyond the central portion.

3. A tire building drum comprising a ring forming the central area of the drum, a plurality of wings about the ring to form the edge portion of the drum, inwardly turned surfaces on the ends of said wings, and means to expand the wings radially outwardly to expose the inwardly turned surfaces to form a bead setting shoulder.

4. A tire building drum comprising a ring forming the central area of the drum, a plurality of wings pivotally mounted about the edge of the ring, downwardly turned surfaces on the projecting ends of said wings, and means acting upon all of said wings to rock them radially outwardly and expose the downwardly turned surfaces to form a bead setting shoulder at the side of the drum.

5. A tire building mechanism comprising a main building drum, auxiliary drums at opposite sides of the main drum, a plurality of wings arranged about the edge of the main drum and constituting a continuation of the outer surface of the main drum, said wings overlying the edges of the auxiliary drums, means to move the auxiliary drums toward and from the main drum, the wings and the auxiliary drums having coacting surfaces which move the wings outwardly on approach of the auxiliary drums to form bead setting shoulders elevated above the surface of the main drum.

6. A tire building mechanism comprising a main building drum, auxiliary drums at opposite sides of the main drum, a plurality of plates pivotally mounted around the edges of the main drum and together forming a continuation of the main drum, the outer edges of the plates having inturned surfaces and being supported on the edges of the auxiliary drums, and means to move the auxiliary drums toward the main drum to rock the plates outwardly and elevate the inturned surfaces to form bead setting shoulders at the sides of the main drum.

7. A tire building apparatus comprising a building drum, a plurality of plates mounted on the edges of of the drum to form continuations of the outer surface of the drum, inwardly turned shoulders on the outer ends of the plates, and means to move all of said plates radially outwardly simultaneously to move the shoulders to a position outwardly of the outer surface of the drum.

8. A tire building apparatus comprising a building drum having an outer building surface, a plurality of plates arranged about the edges of the drum and forming continuations of the building surface, each plate having one end pivotally mounted on the drum, the other end of the plate having an inwardly turned shoulder, and means to rock all of the plates simultaneously to shift the shoulders radially outwardly to form bead setting shoulders around the edges of the main drum.

9. A tire building apparatus comprising a building drum having an outer building surface, a plurality of plates arranged about the edges of the drum, each plate having a central portion forming a continuation of the building surface, a curved portion at the inner end of the plate and seated in the main drum and constituting a bearing for the plate, a downturned shoulder at the outer end of the plate, and means contacting the outer ends of all of said plates to rock them about their bearings and expose the shoulders to form bead setting abutments at the sides of the drum.

10. A tire building apparatus comprising a building drum having an outer building surface, a plurality of plates arranged about the edges of the drum, each plate having a central portion forming a continuation of the building surface, a curved portion at the inner end of the plate and seated in the main drum and constituting a bearing for the plate, a downturned shoulder at the outer end of the plate, auxiliary drums at either side of the main drum, a ledge on the edge of each auxiliary drum underlying the outer ends of the plate, means to move both drums toward the main drum, and camming surfaces between the ledges and the outer ends of the plates to rock the plates about their bearings and expose the shoulders to form bead setting abutments at the sides of the drum.

11. A tire building drum having a tire building surface, a plurality of plates around the edges of the drum, said plates having surfaces forming continuations of the said building surface and having inturned shoulders, and means to move all of said plates radially outwardly of the drum and expose the shoulders to form bead setting abutments at the sides of the drum.

12. A tire building drum having a tire building surface, a plurality of plates pivotally mounted in a circle around an edge of the drum, said plates having surfaces forming continuations of the tire building surface and inturned shoulders, and means to rock all of said plates simultaneously to elevate the shoulders above the building surface to form a bead setting shoulder at the side of the drum.

13. A tire building drum having an outer surface constituting a part of the tire building surface, grooves near the edges of the drum, a plurality of plates having surfaces forming continuations of the building surface, the inner ends of the plates being journaled in the grooves, the outer ends of the plates having inturned shoulders, and means acting on the outer ends of said plates to rock them and to raise the shoulders above the tire building surface of the drum.

14. A tire building drum having an outer surface constituting a part of the tire building surface, grooves near the edges of the drum, a plurality of plates having surfaces forming continuations of the building surface, the inner ends of the plates being located in the grooves, the outer ends of the plates having inturned shoulders, and means acting on the plates to move them in the grooves and to raise the shoulders above the outer surface of the drum.

15. A tire building apparatus comprising a main drum having a tire building surface thereon, grooves on opposite sides of the building surface, a plurality of plates pivotally mounted in said grooves and overhanging the edges of the drum, inturned shoulders on the outer ends of the plates, an auxiliary drum at either side of the main drum, ledges on the edges of the auxiliary drum to underlie the outer ends of the plates, and means to cause the auxiliary drums to approach the main drum, said ledges being shaped to raise the shoulders above the tire building surface on the main drum to form exposed bead setting abutments at the sides of the drum.

References Cited in the file of this patent

UNITED STATES PATENTS

| | | |
|---|---|---|
| 1,860,342 | Heston | May 24, 1932 |
| 2,039,531 | Heston | May 5, 1936 |
| 2,084,009 | Sohl | June 15, 1937 |
| 2,182,176 | Maranville | Dec. 5, 1939 |
| 2,253,477 | Brown | Aug. 19, 1941 |
| 2,565,071 | Frazier | Aug. 21, 1951 |
| 2,567,064 | Frazier | Sept. 4, 1951 |
| 2,614,951 | Iredell | Oct. 21, 1952 |